(12) United States Patent
Lee et al.

(10) Patent No.: US 6,373,630 B1
(45) Date of Patent: Apr. 16, 2002

(54) LIGHT BEAM POLARIZATION CONVERTER

(76) Inventors: Chih-Kung Lee, 6F, No. 3, Lane 165, Tun Hwa North Road, Taipei; Chyan-Chyi Wu, No. 5, Alley 67, Lane 506, Sec. 2, Wen Chang Road, Yong Shun, Da Du, Taichun; Ching-Heng Tang, 2F, No. 8, Alley 1, Lane 387, Section 1, Nei Hu Road, Taipei, all of (TW)

( * ) Notice: Subject to any disclaimer, the term of this patent is extended or adjusted under 35 U.S.C. 154(b) by 0 days.

(21) Appl. No.: 09/565,850

(22) Filed: May 5, 2000

(51) Int. Cl.$^7$ ................................................. G02B 5/30
(52) U.S. Cl. ........................ 359/495; 359/497; 362/19
(58) Field of Search ............................... 359/495, 496, 359/497; 353/20; 362/19

(56) References Cited

U.S. PATENT DOCUMENTS

| | | | |
|---|---|---|---|
| 3,213,753 A | * 10/1965 | Rogers | ........................ 359/497 |
| RE26,506 E | * 12/1968 | Rogers | ........................ 359/497 |
| 4,663,634 A | 5/1987 | Fulton | |
| 5,122,895 A | 6/1992 | Takanashi et al. | |
| 5,164,854 A | 11/1992 | Takanashi et al. | |
| 5,218,653 A | 6/1993 | Johnson et al. | |
| 5,446,807 A | 8/1995 | Baran et al. | |
| 5,455,877 A | 10/1995 | Baran et al. | |
| 5,539,845 A | 7/1996 | van der Tol | |
| 5,619,325 A | 4/1997 | Yoshida | |
| 5,657,160 A | 8/1997 | Miyatake et al. | |
| 5,684,630 A | 11/1997 | Arai | |
| 5,724,179 A | 3/1998 | Hosoi | |
| 5,751,480 A | * 5/1998 | Kitagishi | ..................... 359/495 |
| 5,757,547 A | 5/1998 | Rodman et al. | |
| 5,883,746 A | 3/1999 | Zelenka | |
| 5,900,985 A | 5/1999 | Ho et al. | |
| 5,940,149 A | 8/1999 | Vanderwerf | |
| 5,943,168 A | 8/1999 | Reinsch | |
| 5,982,540 A | 11/1999 | Koike et al. | |
| 5,999,313 A | 12/1999 | Fukushima | |
| 6,011,641 A | 1/2000 | Shin et al. | |
| 6,081,378 A | 6/2000 | Romano et al. | |
| 6,104,536 A | 8/2000 | Eckhardt | |

* cited by examiner

Primary Examiner—Darren Schuberg
(74) Attorney, Agent, or Firm—Baker & McKenzie

(57) ABSTRACT

A light beam polarization converter for converting non-polarized light beams of an illumination source into a single polarization state, which may be utilized in various electro-optical devices, such as liquid crystal projection type televisions. A polarization splitter film and a phase retardation film are utilized to make the incident light beams of a light source focused and refracted with an under plate. The light beam, upon passing through the under plate, goes through a series of optical processes of polarization splitting, reflection, total reflection and phase retardation, and subsequently becomes a light beam of a single polarization state output.

36 Claims, 14 Drawing Sheets

A typical polarization splitter film (angle of incidence with respect to substrate:45degrees)

LIGHT BEAM POLARIZATION CONVERTER

FIELD OF THE INVENTION

The present invention relates generally to light beam polarization devices and more particularly to a light beam polarization converter for electro-optical devices, such as a liquid crystal projection displays.

DESCRIPTION OF THE PRIOR ART

With the advent of the information technology (IT) age, there is an increasing demand for various electro-optical displays, such as liquid crystal projection type television displays. In this type of display, the light source is not inherently integrated, and thus an external source may be required for image display. As the demand for higher quality displays increases, it is becoming more and more important that the utilization efficiency of light sources should be enhanced. A conventional way to increase efficiency is to convert the non-polarized light beams of a light source into linearly polarized light beams having a single polarization state, as disclosed in, for example U.S. Pat. No. 5,122,895 (Polarization converter for converting randomly polarized light to linearly polarized light to Takanashi et al.). Wherein a conventional converter, the so-called P-S converter is disclosed. The P-polarized light component refers to the optical component of the electric field oscillation direction that is parallel to the plane of the incident light beam. The S-polarized light component is the optical component perpendicular to that plane.

As shown in prior art FIG. 1, in a conventional liquid crystal projection type television, the light beam emitted from a light source 10 is projected through a projection lens onto a display (not shown) through the processing of a parallelizing lens 11, a diverging plate 12, a P-S converter 13, splitter lenses 14 and 15, a reflecting mirror 16 and respective liquid crystal displays 301, 302 and 303. The main function of the P-S converter 13 is to reduce the optical loss of light beams when screened through the liquid crystal displays 301, 302 and 303 for specific polarization.

FIG. 2 shows a schematic perspective view of a conventional P-S converter 70. The non-polarized light beams I emitted from a light source travels from the bottom side of P-S converter 70, is converted therein and emitted from the top side as a single S-polarized state light beam.

FIG. 3 shows a typical optical path of a light beam in a conventional P-S converter. The description is illustrated utilizing one (designated "I1") of a plurality of light beams emanating from the light source. The light beam I1 is incident to the P-S converter through an anti-reflection film 70, and then subsequently becomes a light beam I2 having both P- and S-polarization states. The light beam I2 is then incident on a polarization state splitter film 73 with a P-component I4 penetrating through the splitter film 73 and being converted by a half wave plate 78. Light beam I4 then travels further through an anti-reflection film 79 and becomes a light beam 16 of S-polarization state. The component of the light beam I2 failing to penetrate through the splitter film 73 is reflected and becomes a light beam I3 of S-polarization state, after which the light beam I3 is reflected by a highly reflective film 75 and penetrates through an anti-reflection film 77. Finally, the output thereof is a light beam 16 of S-polarization state. Since the above effect of polarization conversion may not be obtained if the light beam emitted from the light source is incident to the portion 81 as shown in FIG. 3, the conventional P-S converter may only achieve efficiencies of at best 50% in converting the polarization state of light beams. In addition to such lack of efficiency, the configuration of conventional P-S converters is complex and typically involves relatively high costs of production. It is also known in the art that a conventional display incorporating such a conventional converter is notorious for high power consumption.

SUMMARY OF THE INVENTION

In view of the above problems, the first object of the present invention is to provide a light beam polarization converter for converting an illumination source into a single polarization light source, which may convert the light at extremely low optical loss and is suitable for mass production in terms of production cost.

The second object of the present invention is to provide a light beam polarization converter for converting an illumination source into a single polarization light source, which is easy to use or to add on to a conventional apparatus.

To achieve the first object, the present invention provides a light beam polarization converter for converting an illumination light source into a polarization light source, comprising an under plate having an undulated lower surface and a ridged upper surface; a substrate having a ridged lower surface, substantially complementary to the upper surface of the under plate and facing therewith, and a ridged upper surface; a phase retardation film of high reflectivity disposed partially between the substrate and the under plate; a top cover having a lower surface, substantially complementary to the upper surface of the substrate and facing therewith, and an upper surface; and a polarization splitter film disposed between the substrate and the top cover.

For achieving enhanced optical performance, the ridge pitch of the ridged surfaces may be constant or varied, and the ridge lines thereof are arranged as being not parallel to each other, thus allowing greater freedom of converter design. Moreover, the lower surface of the under plate and the upper surface of the top cover may respectively have various undulations, such as cylindrical, spherical or non-spherical, corresponding to each other in a conjugate way to control the optical output angle, and thus enhance the transmitting efficiency of light beams while passing through the converter.

To achieve the second object, the present invention provides a light beam polarization converter for converting an illumination light source into a polarization light source, comprising an under plate having an undulated lower surface and a ridged upper surface; a substrate having a ridged lower surface, substantially complementary to the upper surface of the under plate and facing therewith, and a substantially flat upper surface; a phase retardation film of high reflectivity provided partially between the substrate and the under plate; a top cover film having a flat lower surface, substantially complementary to the upper surface of the substrate and facing therewith, and a ridged upper surface; a top cover having a lower surface, substantially complementary to the upper surface of the top cover film and facing therewith, and an upper surface; and a polarization splitter film provided between the upper surface of the top cover film and the lower surface of the top cover.

With the above top cover film, which is soft and flexible when joined with the top cover and the polarization splitter film, it is very convenient to apply this soft configuration onto the under plate and achieve the effect and advantage in accordance with the present invention.

With the configuration disclosed in accordance with the present invention, the light beam polarization converter is simple and easy to produce, and achieves optical efficiency no less than that of a conventional one. In particular, the present invention provides a significant advantage of quick adaptation to conventional optical devices.

BRIEF DESCRIPTION OF DRAWINGS

The above and other features, effects and advantages of the light beam polarization of the present invention may be clearly understood from the following description of preferred embodiments in connection with the accompanying drawings, wherein.

DETAILED DESCRIPTION OF THE PREFERRED EMBODIMENT

Figure 1:
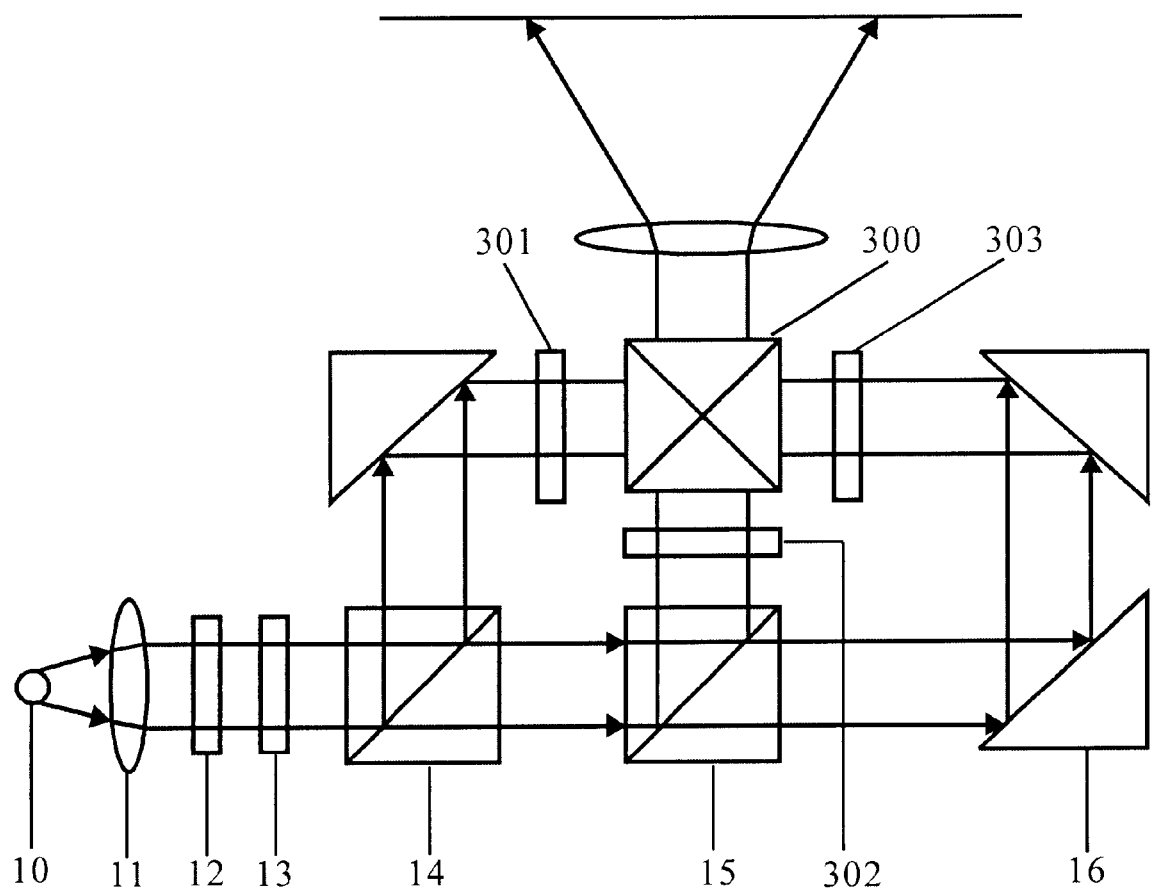
FIG. 1 is a schematic view of a conventional liquid crystal projection type television, showing an installation position and function of a P-S converter.
Figure 2:
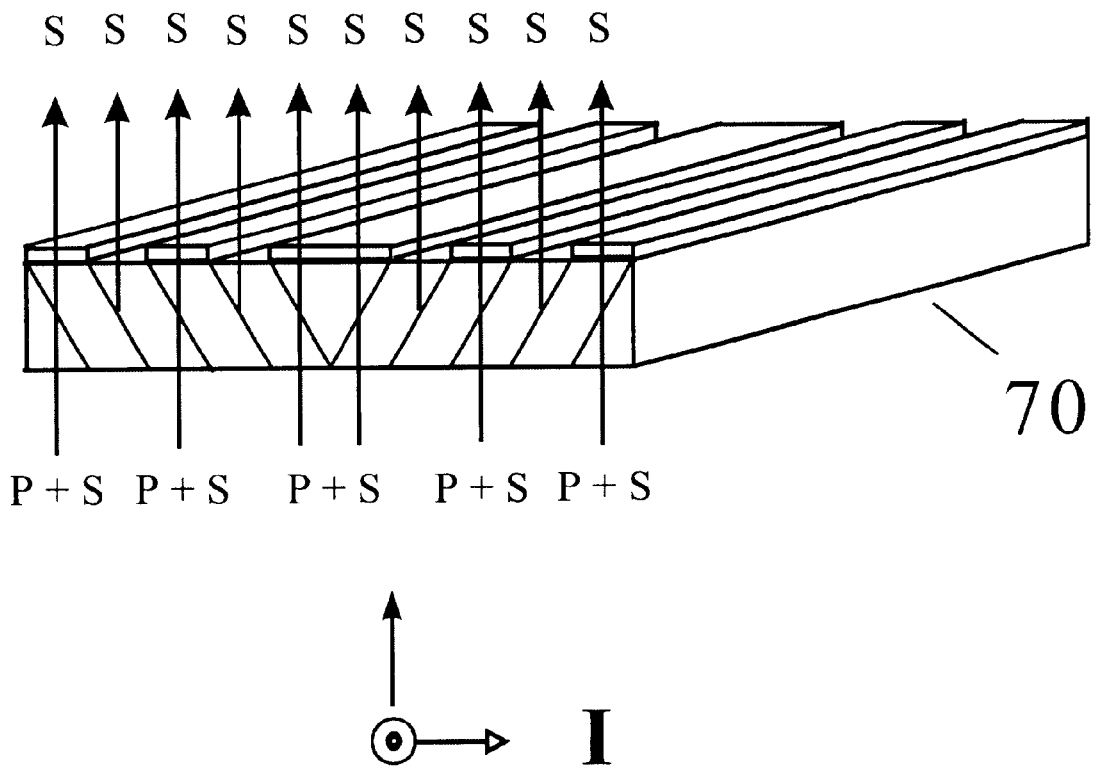
FIG. 2 is a perspective view showing a conventional P-S converter.
Figure 3:
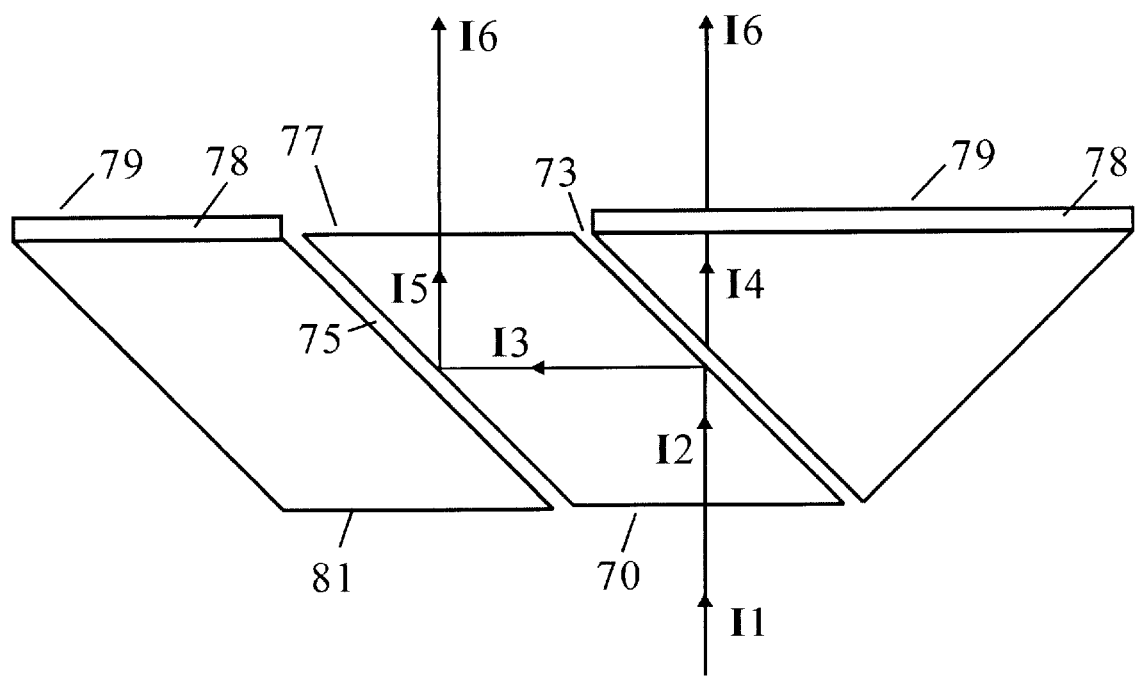
FIG. 3 illustrates an exemplary optical path traversing a conventional P-S converter.
Figure 4:
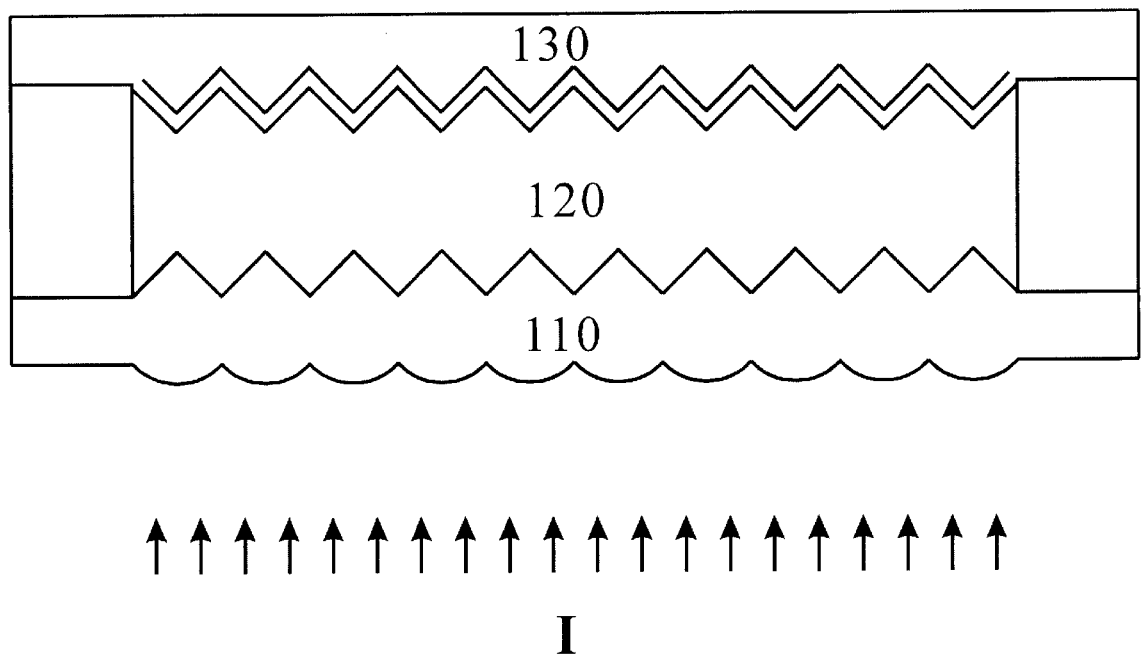
FIG. 4 is a cross sectional view showing a light beam polarization converter in accordance with one embodiment of the present invention.

With reference to FIG. 4, a sectional view of a light beam polarization converter 100 in accordance with one embodiment of the present invention is shown. The converter 100 has a laminate configuration, comprising an under plate 110, a substrate 120 and a top cover 130, joined together in the above sequence. A phase retardation film (not shown) is provided partially between the under plate 110 and the substrate 120, whereas a polarization splitter film is provided between the substrate 120 and the top cover 130. The under plate 110 has a lower surface of undulation with a layer of anti-reflection film being coated thereon, which may increase the upward transmissivity of the light beam I from the bottom. The under plate 110 has a ridged upper surface, the ridge angle between two neighboring ridges is 90 degrees. Accordingly, the ridge angles of the upper and lower surfaces of the substrate 10 and the lower surface of the top cover are all 90 degrees. The top cover 130 has a substantially flat upper surface on which a layer of anti-reflection film may be optionally coated, to increase the transmissivity of light through the converter.

The phase retardation film is provided partially between the under plate 110 and the substrate 120 in a way the incident light beam I which penetrates the under plate 110 may be focused by the undulated surface thereof and then penetrates the substrate 109 through the portions without phase retardation film thereon. The lower surface of the under plate 110 need not be of specific profile, but is designed for the purpose of converging the incident light beam I which thereafter penetrates through the portions having no phase retardation film and then travels into the substrate 120. The phase retardation film may be applied through evaporation or coating.

In one embodiment of the present invention, the ridge angle between two neighboring ridges on the ridged surfaces may be 90 degrees. Therefore, the incident light beam may go through continuous reflection or total reflection on the lower surface of the substrate 120. For matching the output specification of the converter 100, the composition of the polarization splitter film between the top cover 130 and substrate 120 may be adjusted. to provide linearly or otherwise polarized light beam output.

In producing the converter 100 in accordance with the present invention, the top cover 130 and substrate 120 should be joined together for a simple and feasible polarization splitter film. In other words, both lateral sides of the polarization splitter film should be made of optically transparent material, such as polymethylmethacrylate (PMMA), polycarbonate (PC) or ARTON™. The top cover 130 may be produced through spraying, pouring, injection molding of smooth plating in a mass production therefor.

Figure 5:
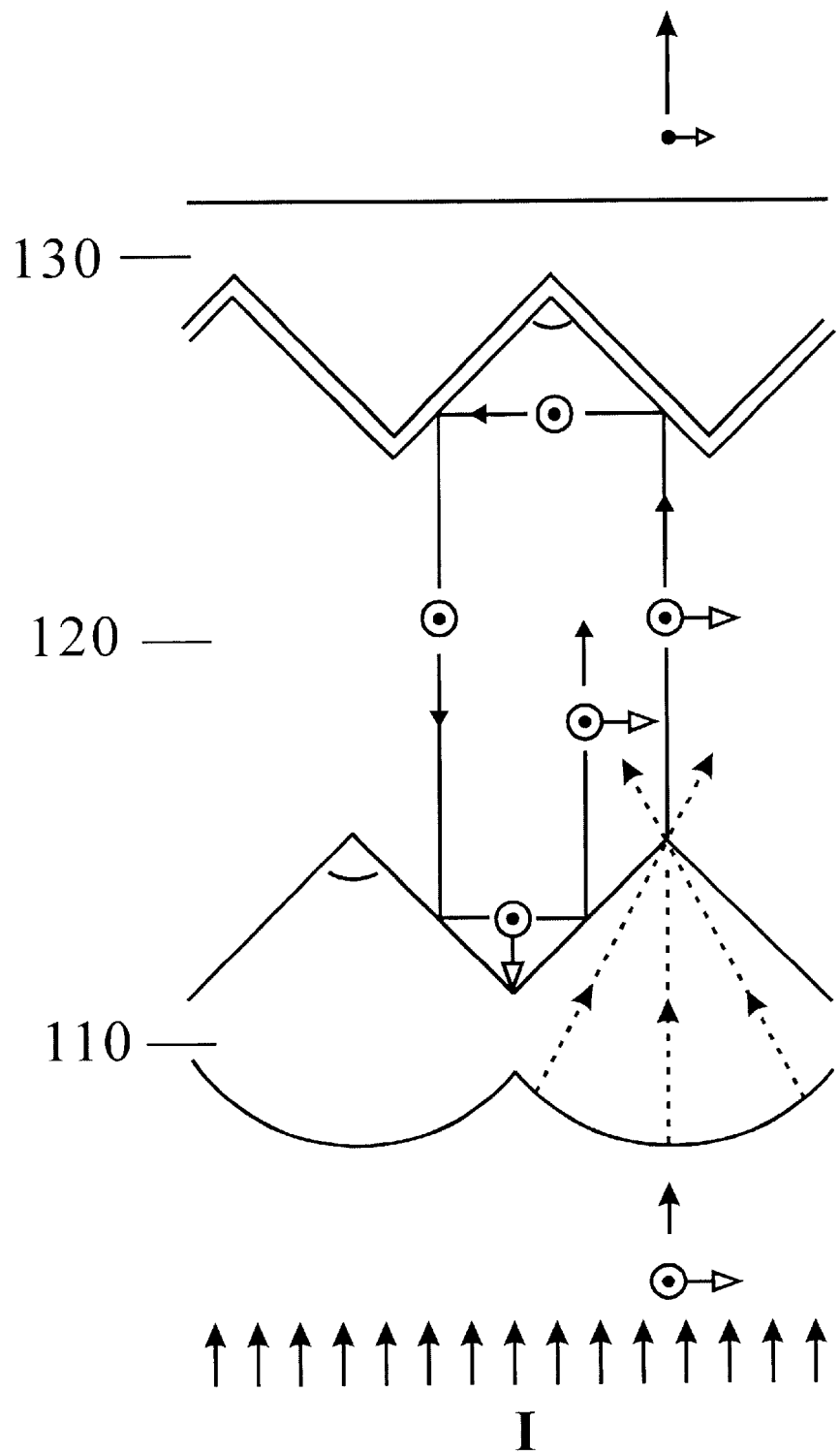
FIG. 5 shows the optical path occurring in the light beam polarization converter in accordance with one embodiment of the present invention.
Figure 6:
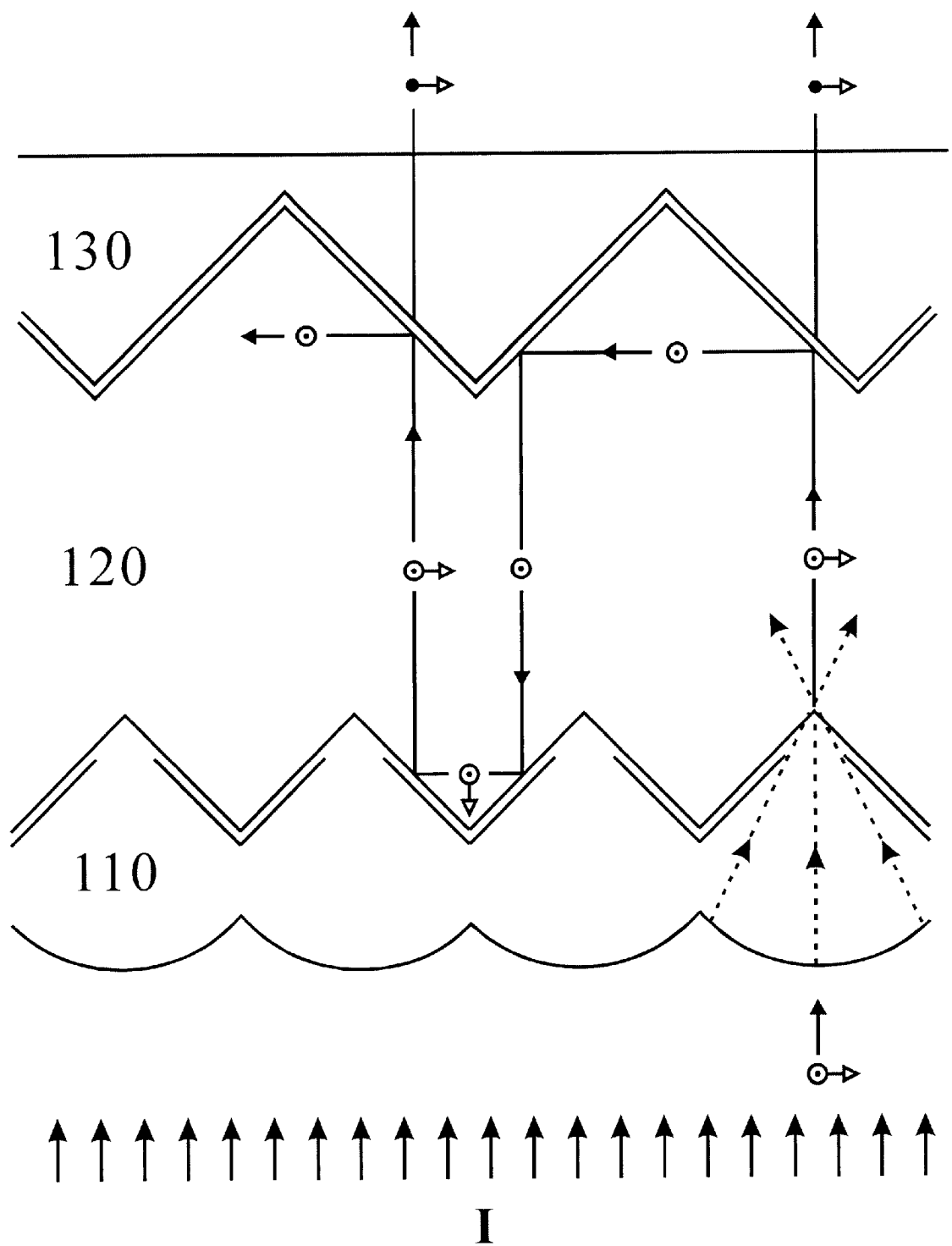
FIG. 6 shows the optical path occurring in the light beam polarization converter in accordance with another embodiment of the present invention.

With reference to FIGS. 5 and 6, an optical path is shown of the light beam I entering through the under plate 110. The S-polarized component of the light beam is represented by a solid arrow, and the P-component by a hollow arrow. The light beam I is converged by the undulated surface and then enters into the substrate 120 through the interface between the under plate 110 of no phase retardation film and the substrate 120. The P-polarized component is not influenced by this configuration, and may directly emanate from the upper surface 120 of the top cover 130. The S-polarized component is continuously reflected by the ridged surfaces and is consequentially transformed into a light beam having both P- and S-polarized components simultaneously. Thereafter, the P-component in turn passes through the polarization splitter film and the top cover 130 and emits therefrom. The S-component is progressively reflected and transformed into a light beam having both P- and S-components simultaneously. FIG. 5 shows an embodiment wherein the ridge pitches of the upper and lower ridged surfaces are equal. FIG. 6 shows another embodiment wherein the ridge pitches of the upper and lower surfaces are not equal. The above two arrangements may achieve substantially the same effect.

Figure 7:
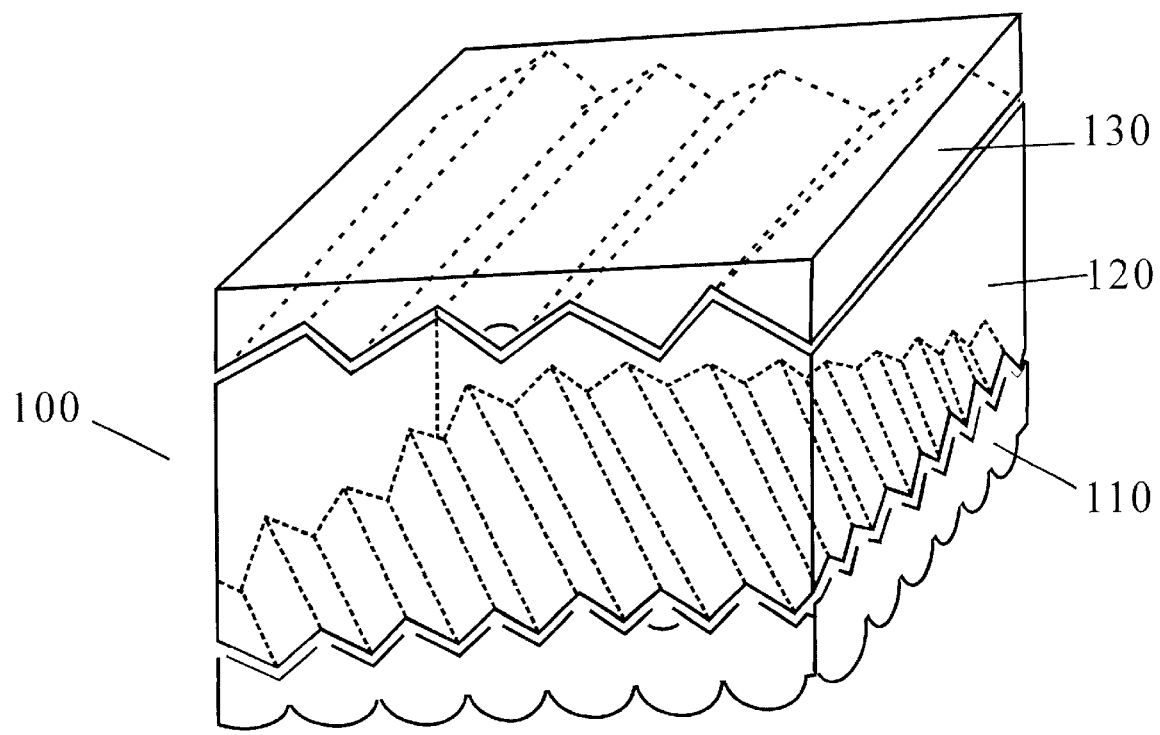
FIG. 7 is a perspective view of the light beam converter in accordance with one embodiment of the present invention, wherein the ridge lines are not parallel to each other.
Figure 8:
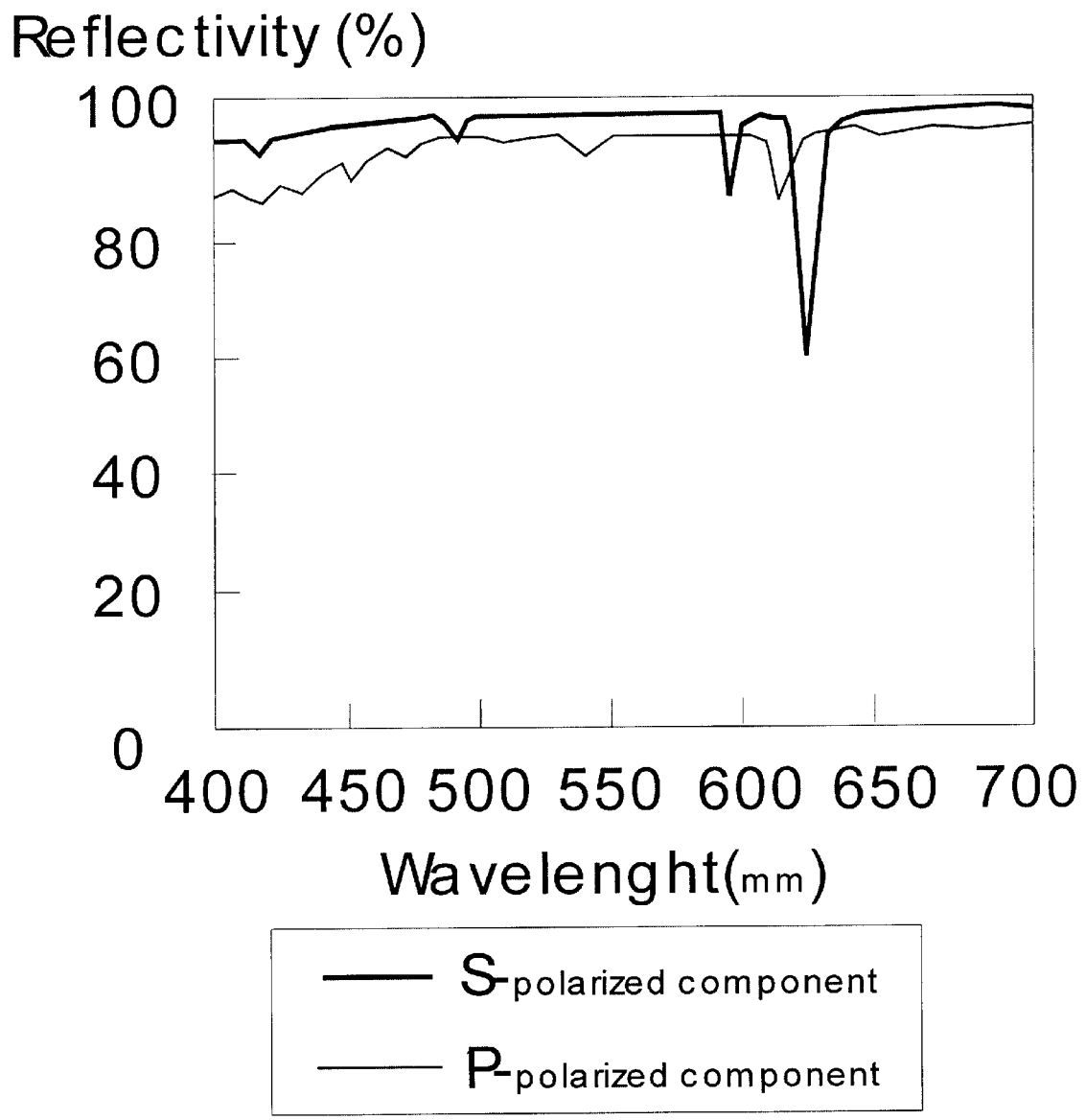
FIG. 8 shows the relationship between the reflectivity to P-S polarized component and the wavelength of a light beam with respect to a typical phase retardation film of high reflectivity.
Figure 9:
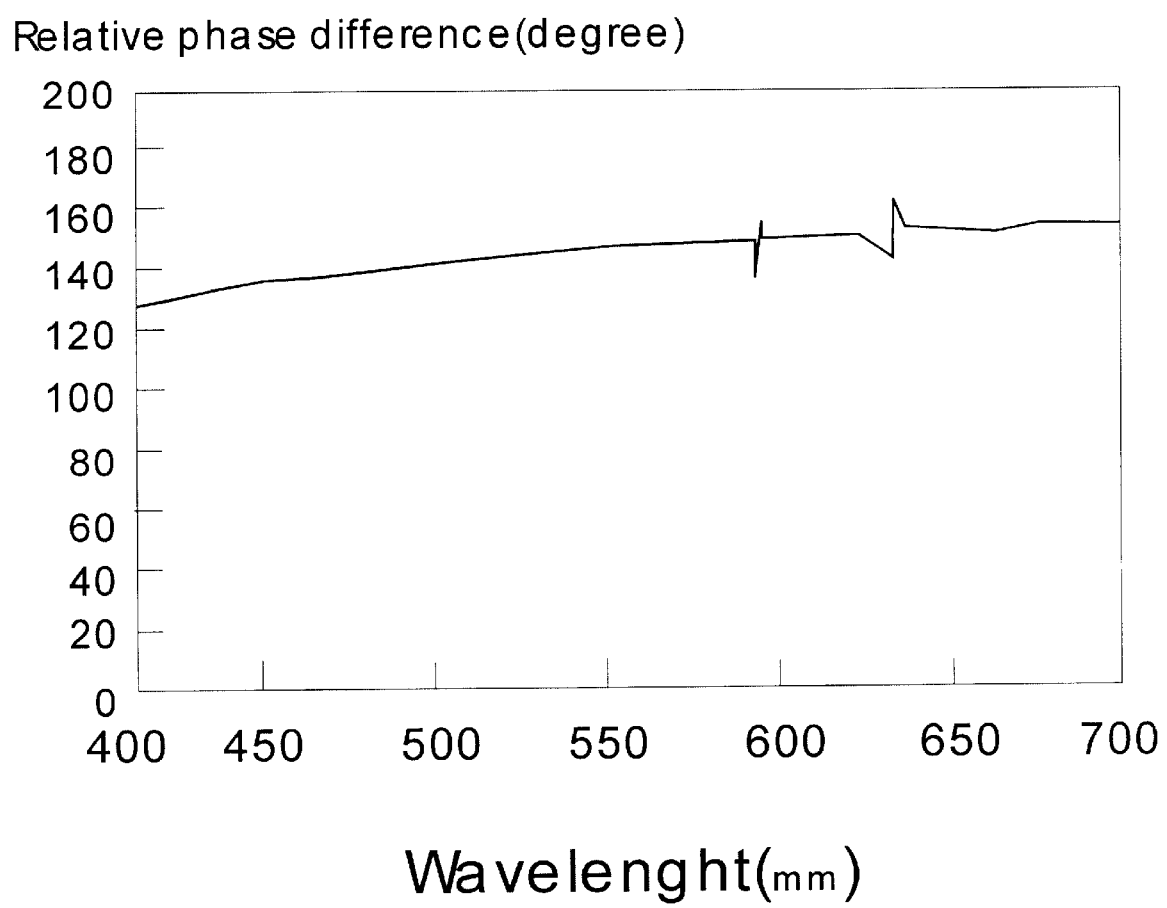
FIG. 9 shows the relationship between the relative phase difference to P-S polarized component and the wavelength of a light beam with respect to a typical phase retardation film of high reflectivity.

With reference to FIG. 7, there is disclosed another converter 100 in accordance with the present invention, wherein the ridge pitches of the upper and lower ridge lines are not equal and the upper and lower ridge lines are not parallel to each other, which increases the freedom in designing the phase retardation film. It should be noted that any conventional reflection film may be advantageously utilized to achieve the effect by the phase retardation film disclosed in the present invention if the upper and lower ridge lines are not parallel. On the other hand, it will be difficult to design and produce the phase retardation film under the parallel condition. A possible solution is to add certain magnetic material into the film. Since the non-parallel condition for the ridgelines is easy to achieve, the present invention provides a favorable and simple solution.

For clarifying the features of the present invention, the configuration and inventive principles of the present invention is in detail described below.

The under plate 110 has a lower surface of cylindrical, spherical or non-spherical undulation and an upper ridged surface. The upper surface may be pyramidal if the lower surface of the under plate 110 is of spherical or non-spherical undulation for focusing the incident light beam as a point light source. To sum up, the fundamental function of the under plate is to ensure that the incident light beam enters the substrate and the top cover at high efficiency. The supplementary function of the upper surface of the under plate is to provide a place for applying the phase retardation film, and alternatively the upper surface of the lower plate may be ridged. Notwithstanding the above, any modification of the surface profile other than the ridged surface may be deemed as falling within the scope of the present invention as defined in the claims.

The upper and lower surfaces of the substrate are ridged and having ridge angles, different or identical from each other. Their ridge pitches may be neither equal nor constant, so as to avoid the morie effect. The neighboring ridged surfaces should be substantially complementary to each other, so as to facilitate the insertion of a film between the following attachment.

Figure 10:
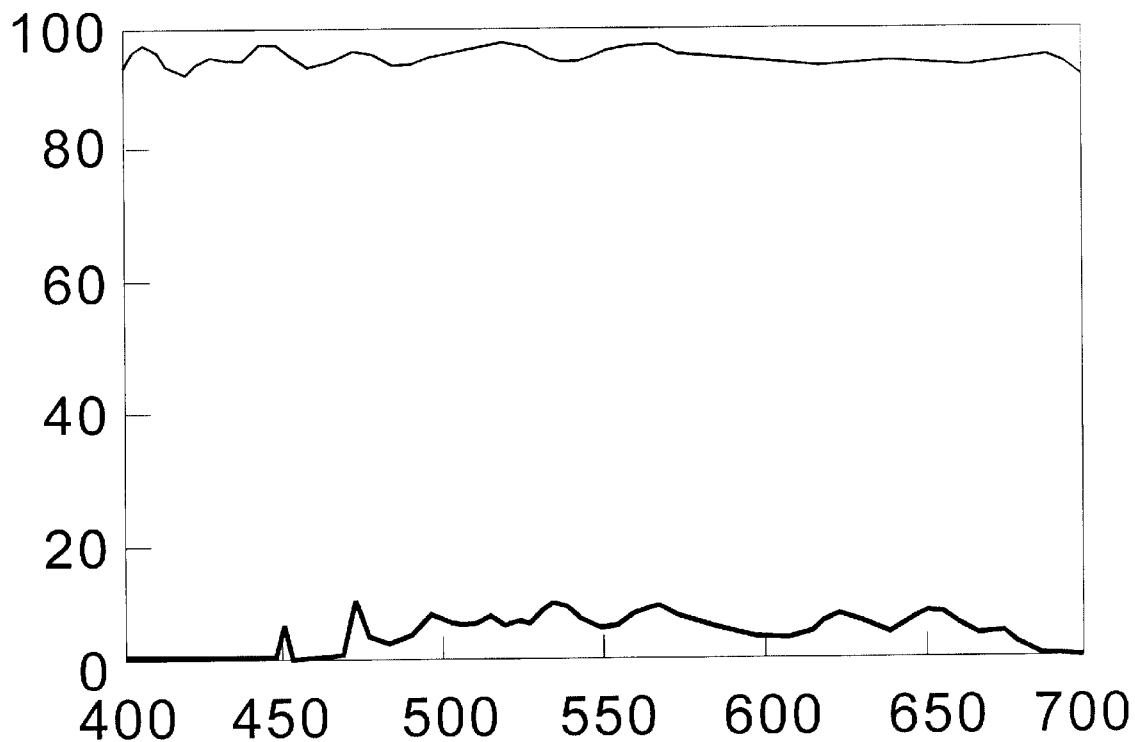
FIG. 10 shows the relationship between the transmissivity of a P-S polarized component and the wavelength of a light beam with respect to a typical polarization splitter film.
Figure 10:
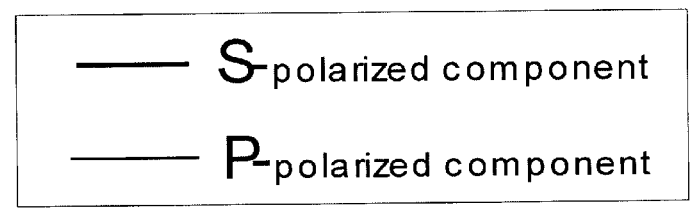
Figure 11:
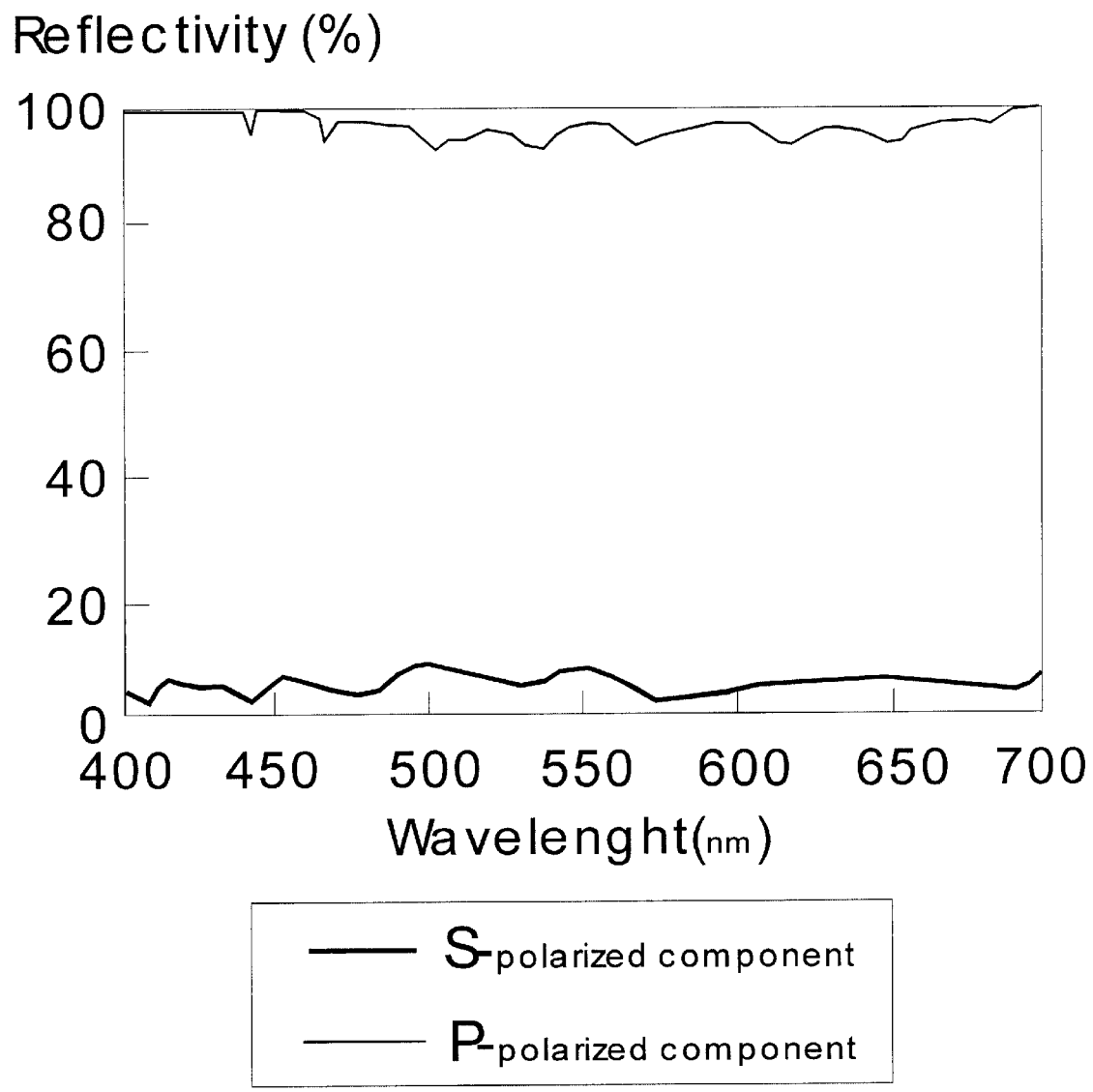
FIG. 11 shows the relationship between the reflectivity to P-S polarized component and the wavelength of a light beam with respect to a typical polarization splitter film.

In consideration of the production process, the substrate may be made of any optical material, such as PMMA, PC or ARTON™ plastic or various glasses. It is necessary to determine in advance the refractivity of the substrate in designing the optical film. Table 1 shows the relationship between the water absorptivity and refractivity over different wavelengths for ARTON. FIGS. 10 and 11 show the function of the phase retardation film and the corresponding polarization splitter film.

It may be noted that in practical production, the phase retardation film is applied partially on the upper surface of the under plate, with exception to the convex portion thereof. Therefore, the phase retardation film may first be applied wholly on the upper surface of the under plate and be partially removed at the unnecessary (convex) portion through polishing. For example, if the substrate is made of PMMA having optical coefficient 1.53, the ridge angle of the lower surface is 90 degrees, and the wavelength of the incident light beam is 400 to 700 nm, the typical composition of the film and its thickness may be inferred from table 2. If the substrate is made of ARTON, under the same conditions as above, table 3 shows the composition.

The polarization splitter film is provided between the top cover and the substrate, which may screen particularly polarized light beam as the output while making any differently polarized light beam reflected back to the inside of the substrate, once the top cover and the substrate are joined together. For example, under the condition that the substrate is made of PMMA having optical coefficient 1.53, the ridge angle of the upper surface is 90 degrees and the wavelength of the incident light beam is 400 to 700 nm, the polarization splitter film may be formed through multi-layer evaporation coating with the material and film thickness as shown in table 4. If the substrate is made of ARTON as shown in table 1 under 40° C., the material and its thickness as shown in table 5 may be used.

Figure 12:
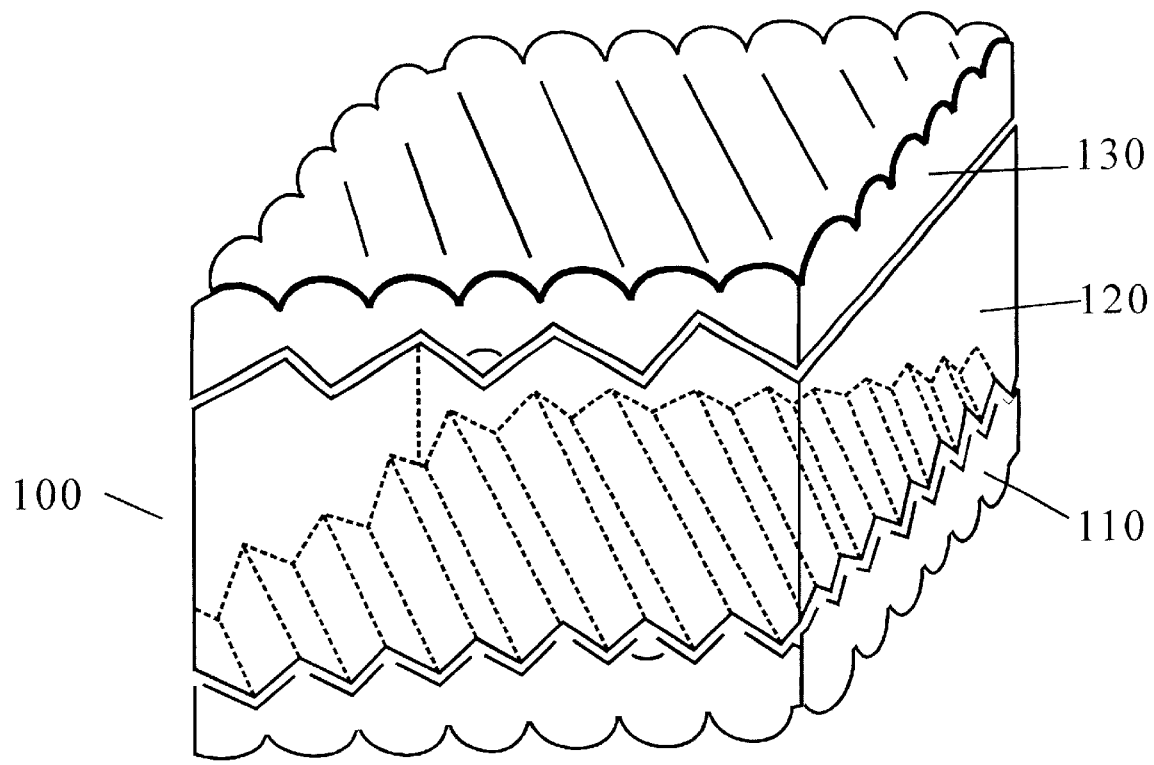
FIG. 12 is a perspective view of the light beam polarization in accordance with one embodiment of the present invention, wherein the upper surface of the top cover has a spherical undulation.
Figure 13:
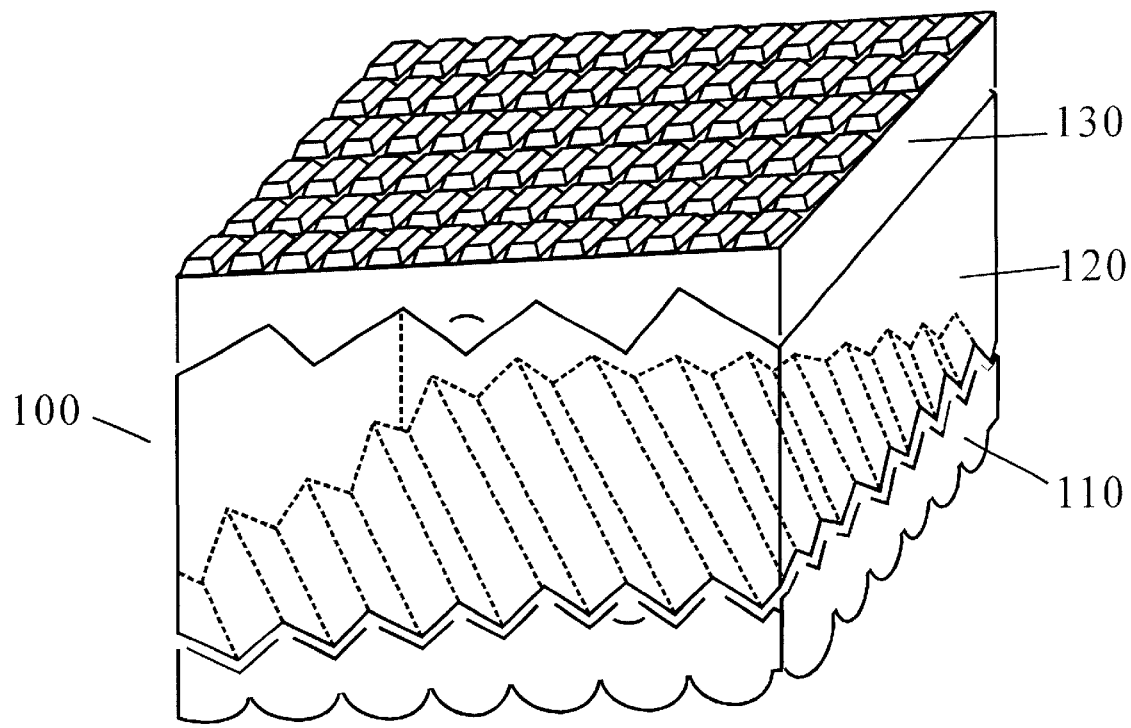
FIG. 13 is a perspective view of the light beam polarization in accordance with another embodiment of the present invention, wherein the upper surface of the top cover has a regular square protuberances.

For increasing the transmissivity by the light beam, the upper surface of the top cover may be applied with an anti-reflection film. Moreover, its upper surface may be substantially flat or undulated as shown in FIGS. 12 and 13, for controlling the output angle of the incident light beam as being in parallel or of any other angle. For example, the light beam is incident on the under plate with an angle almost in parallel thereto, since the upper surface of the top cover has an undulated surface complementary with the lower surface of the under plate in a conjugate relationship, and thus the output angle of the polarized light beam may be controlled. In addition, the diffusion angle of the light beam may be controlled to determine the output illumination level over different view angles.

Figure 14:
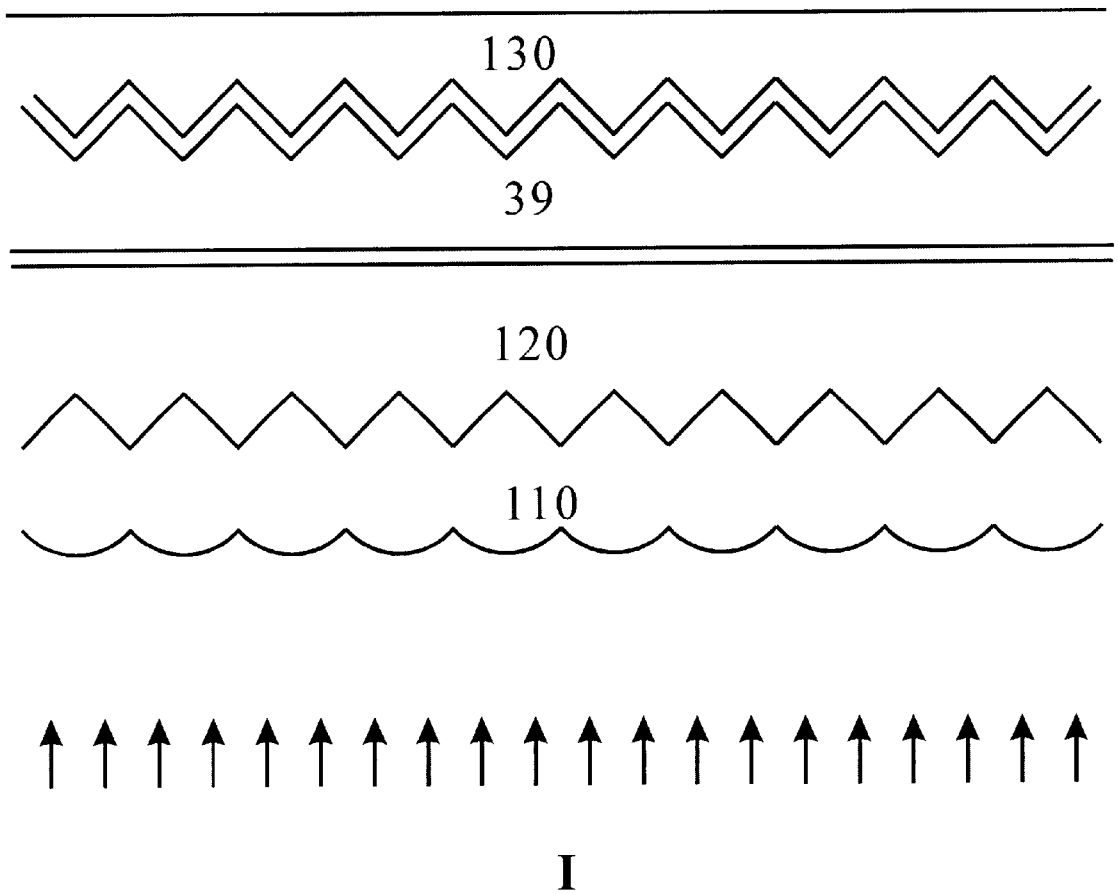
FIG. 14 is a sectional view of the light beam polarization converter in accordance with another embodiment of the present invention.

With reference to FIG. 14, the ridged portions at the interface between the substrate 120 and the top cover 130 may be avoided to form a one-side flat substrate. The lower surface of the top cover may be applied with a polarization splitter film thereon, and thereafter a top cover film 39 is formed onto the lower surface of the top cover through spraying or pouring. As a result, the top cover made of soft material may be combined with the polarization splitter film and the top cover film to become a soft and flexible configuration, which is easy to use. In use, the converter may be divided into two portions, upper and lower, at the flat surface of the substrate. The thus divided portions may be applied respectively at two sides of a transparent flat optical device to provide the function of polarization splitting.

The above description is for an illustrative purpose in accordance with one embodiment of the polarization state converter of the present invention. Any modification or amendment which may be achieved by those skilled in the art will fall within the scope and spirit of the present invention. That is, the real and distinctive scope of the present invention should be defined by the accompanying claims.

TABLE 1

ARTON FX26
Main Chain: NORBORNENE
Branch Chain: polyester function group

| | Measured wavelength | | | | |
|---|---|---|---|---|---|
| | 794.76 nm | 656 nm | 588 nm | 486 nm | 436 nm |
| Absorptivity (%) | | | | | |
| 0.01 | 1.5161 | 1.5198 | 1.5227 | 1.5298 | 1.5354 |
| 0.25 | 1.5163 | 1.5200 | 1.5230 | 1.5300 | 1.5357 |
| temperature (° C.) | | | | | |
| 30 | 1.515 | 1.519 | 1.521 | 1.528 | 1.534 |
| 40 | 1.514 | 1.518 | 1.520 | 1.527 | 1.533 |

TABLE 2

Typical phase retardation film as to composition and thickness
(unit: nm, substrate: PMMA)

ZnS 202.21, MgF$_2$ 200.00, ZnS 83.66, MgF$_2$ 200.00,
ZnS 58.46, MgF$_2$ 203.95, ZnS 200.19, MgF$_2$ 202.94,
ZnS 78.42, MgF$_2$ 184.10, ZnS 210.19, MgF$_2$ 196.22,
ZnS 235.49, MgF$_2$ 404.42, ZnS 105.38, MgF$_2$ 165.89,
ZnS 219.69, MgF$_2$ 207.75, ZnS 211.30, MgF$_2$ 184.61,
ZnS 57.30, MgF$_2$ 264.81, ZnS 168.19, MgF$_2$ 200.24,
ZnS 95.51, MgF$_2$ 146.82, ZnS 141.62, MgF$_2$ 62.71,
ZnS 61.65, MgF$_2$ 245.83, ZnS 203.82, MgF$_2$ 110.37,
ZnS 49.58, MgF$_2$ 136.26, ZnS 92.75, Ag 61.14

TABLE 3

Typical phase retardation film as to composition and thickness
(unit: nm, substrate: ARTON ™)

ZnS 202.44, MgF$_2$ 200.00, ZnS 83.68, MgF$_2$ 200.00,
ZnS 60.66, MgF$_2$ 206.53, ZnS 200.00, MgF$_2$ 200.00,
ZnS 85.56, MgF$_2$ 176.92, ZnS 207.83, MgF$_2$ 186.64,
ZnS 228.17, MgF$_2$ 450.70, ZnS 102.87, MgF$_2$ 163.44,
ZnS 223.36, MgF$_2$ 193.18, ZnS 206.10, MgF$_2$ 180.03,
ZnS 62.29, MgF$_2$ 255.92, ZnS 180.50, MgF$_2$ 238.48,
ZnS 81.97, MgF$_2$ 133.27, ZnS 132.49, MgF$_2$ 101.40,
ZnS 62.55, MgF$_2$ 264.24, ZnS 189.91, MgF$_2$ 85.94,
ZnS 59.96, MgF$_2$ 140.79, ZnS 89.76, Ag 60.92

TABLE 4

Typical polarization splitter film as to composition and thickness
(Unit: nm, substrate: PMMA)

ZnS 20.99, Na$_3$AlF$_6$ 98.19, ZnS 47.15, Na$_3$AlF$_6$ 99.16,
ZnS 29.58, Na$_3$AlF$_6$ 141.21, ZnS 40.27, Na$_3$AlF$_6$ 94.87,
ZnS 44.40, Na$_3$AlF$_6$ 119.53, ZnS 45.04, Na$_3$AlF$_6$ 92.66,
ZnS 154.73, Na$_3$AlF$_6$ 169.16, ZnS 15.99, Na$_3$AlF$_6$ 75.86,
ZnS 87.82, Na$_3$AlF$_6$ 283.13, ZnS 65.74, Na$_3$AlF$_6$ 96.03,
ZnS 33.77, Na$_3$AlF$_6$ 110.39, ZnS 70.09, Na$_3$AlF$_6$ 283.27,
ZnS 73.35, Na$_3$AlF$_6$ 100.38, ZnS 36.82, Na$_3$AlF$_6$ 99.62,
ZnS 46.08, Na$_3$AlF$_6$ 316.85, ZnS 97.96, Na$_3$AlF$_6$ 239.98,
ZnS 80.59, Na$_3$AlF$_6$ 234.61, ZnS 93.97, Na$_3$AlF$_6$ 249.77,
ZnS 108.62, Na$_3$AlF$_6$ 120.21

TABLE 5

Typical polarization splitter film as to composition and thickness
(Unit: nm, substrate: ARTON ™)

ZnS 10.57, Na$_3$AlF$_6$ 125.72, ZnS 51.25, Na$_3$AlF$_6$ 55.35,
ZnS 48.71, Na$_3$AlF$_6$ 147.30, ZnS 28.53, Na$_3$AlF$_6$ 110.45,
ZnS 49.03, Na$_3$AlF$_6$ 119.80, ZnS 40.04, Na$_3$AlF$_6$ 100.49,
ZnS 153.25, Na$_3$AlF$_6$ 326.16, ZnS 97.71, Na$_3$AlF$_6$ 276.36,
ZnS 56.00, Na$_3$AlF$_6$ 93.48, ZnS 35.15, Na$_3$AlF$_6$ 113.18,
ZnS 78.81, Na$_3$AlF$_6$ 287.44, ZnS 62.71, Na$_3$AlF$_6$ 104.21,
ZnS 37.74, Na$_3$AlF$_6$ 106.49, ZnS 51.39, Na$_3$AlF$_6$ 307.32,
ZnS 91.51, Na$_3$AlF$_6$ 254.75, ZnS 80.68, Na$_3$AlF$_6$ 236.81,
ZnS 93.10, Na$_3$AlF$_6$ 260.58, ZnS 104.44, Na$_3$AlF$_6$ 134.42,

What is claimed is:

1. A light beam polarization converter for converting an illumination light source into a polarization light source, comprising
    an under plate having an undulated lower surface and a ridged upper surface;
    a substrate having a ridged lower surface, substantially complementary to the upper surface of the under plate and facing therewith, and a ridged upper surface;
    a phase retardation film of high reflectivity provided partially between the substrate and the under plate;
    a top cover having a lower surface, substantially complementary to the upper surface of the substrate and facing therewith, and an upper surface; and
    a polarization splitter film provided between the substrate and the top cover.

2. The light beam polarization converter according to claim 1, wherein the ridge pitch of the upper surface of the under plate is not equal to the ridge pitch of the upper surface of the substrate.

3. The light beam polarization converter according to claim 1, wherein the ridge lines of the upper surface of the under plate are not parallel to the ridge lines of the upper surface of the substrate.

4. The light beam polarization converter according to claim 1, wherein the ridge angles between two neighboring ridges, of the upper surfaces of the under plate and of the substrate, are within the range from 45 degrees to 135 degrees, respectively.

5. The light beam polarization converter according to claim 1, wherein the upper surface of the top cover is substantially flat.

6. The light beam polarization converter according to claim 1, wherein the lower surface of the under plate and the upper surface of the top cover are, respectively, cylindrically undulated surfaces, corresponding to each other in a conjugate way.

7. The light beam polarization converter according to claim 1, wherein the lower surface of the under plate and the upper surface of the top cover are, respectively, spherically undulated surfaces, corresponding to each other in a conjugate way.

8. The light beam polarization converter according to claim 1, wherein the lower surface of the under plate and the upper surface of the top cover are, respectively, non-spherically undulated surfaces, corresponding to each other in a conjugate way.

9. The light beam polarization converter according to claim 1, wherein the upper surface of the top cover has a plurality of regular protuberances.

10. The light beam polarization converter according to claim 1, wherein the upper surface of the top cover has a multiplicity of staggered protuberances.

11. The light beam polarization converter according to claim 1, wherein the top cover is formed through spraying.

12. The light beam polarization converter according to claim 1, wherein the top cover is formed through pouring.

13. The light beam polarization converter according to claim 1, wherein the top cover is formed through injection molding.

14. The light beam polarization converter according to claim 1, wherein the top cover is formed through smooth plating.

15. The light beam polarization converter according to claim 1, wherein the ridge pitch of the upper surface of the substrate is constant.

16. The light beam polarization converter according to claim 1, wherein the ridge pitch of the upper surface of the substrate is not constant.

17. The light beam polarization converter according to claim 1, wherein the ridge pitch of the lower surface of the substrate is constant.

18. The light beam polarization converter according to claim 1, wherein the ridge pitch of the lower surface of the substrate is not constant.

19. A light beam polarization converter for converting an illumination light source into a polarization light source, comprising an under plate having an undulated lower surface and a ridged upper surface;

a substrate having a ridged lower surface, substantially complementary to the upper surface of the under plate and facing therewith, and a substantially flat upper surface;

a phase retardation film of high reflectivity disposed partially between the substrate and the under plate;

a top cover film having a flat lower surface, substantially complementary to the upper surface of the substrate and facing therewith, and a ridged upper surface;

a top cover having a ridged lower surface, substantially complementary to the upper surface of the top cover film and facing therewith, and an upper surface; and a polarization splitter film disposed between the upper surface of the top cover film and the lower surface of the top cover.

20. The light beam polarization converter according to claim 19, wherein the ridge pitch of the upper surface of the under plate is not equal to the ridge pitch of the upper surface of the top cover film.

21. The light beam polarization converter according to claim 19, wherein the ridge lines of the upper surface of the under plate are not parallel to the ridge lines of the upper surface of the top cover film.

22. The light beam polarization converter according to claim 19, wherein the ridge angles between two neighboring ridges, of the upper surfaces of the under plate and of the top cover film, are within the range from 45 degrees to 135 degrees, respectively.

23. The light beam polarization converter according to claim 19, wherein the upper surface of the top cover is substantially flat.

24. The light beam polarization converter according to claim 19, wherein the lower surface of the under plate and the upper surface of the top cover are, respectively, cylindrically undulated surfaces, corresponding to each other in a conjugate way.

25. The light beam polarization converter according to claim 19, wherein the lower surface of the under plate and the upper surface of the top cover are, respectively, spherically undulated surfaces, corresponding to each other in a conjugate way.

26. The light beam polarization converter according to claim 19, wherein the lower surface of the under plate and the upper surface of the top cover are, respectively, non-spherically undulated surfaces, corresponding to each other in a conjugate way.

27. The light beam polarization converter according to claim 19, wherein the upper surface of the top cover has a multiplicity of regular protuberances.

28. The light beam polarization converter according to claim 19, wherein the upper surface of the top cover has a multiplicity of staggered protuberances.

29. The light beam polarization converter according to claim 19, wherein the top cover is formed through spraying.

30. The light beam polarization converter according to claim 19, wherein the top cover is formed through pouring.

31. The light beam polarization converter according to claim 19, wherein the top cover is formed through injection molding.

32. The light beam polarization converter according to claim 19, wherein the top cover is formed through smooth plating.

33. The light beam polarization converter according to claim 19, wherein the ridge pitch of the upper surface of the under plate is constant.

34. The light beam polarization converter according to claim 19, wherein the ridge pitch of the upper surface of the under plate is not constant.

35. The light beam polarization converter according to claim 19, wherein the ridge pitch of the upper surface of the top cover film is constant.

36. The light beam polarization converter according to claim 19, wherein the ridge pitch of the upper surface of the top cover film is not constant.

* * * * *